July 30, 1935.   L. SIMON ET AL   2,009,749

SHOCK ABSORBER

Filed Feb. 4, 1932   7 Sheets-Sheet 1

Lucien Simon
René Marcon
INVENTORS

BY CA Snow & Co.
ATTORNEYS.

July 30, 1935.  L. SIMON ET AL  2,009,749

SHOCK ABSORBER

Filed Feb. 4, 1932  7 Sheets-Sheet 2

Lucien Simon
René Marcon
INVENTORS

BY C. A. Snow & Co.
ATTORNEYS.

July 30, 1935.  L. SIMON ET AL  2,009,749

SHOCK ABSORBER

Filed Feb. 4, 1932  7 Sheets-Sheet 3

Lucien Simon
René Marcon
INVENTORS

BY C.A.Snow&Co.
ATTORNEYS.

July 30, 1935.  L. SIMON ET AL  2,009,749
SHOCK ABSORBER
Filed Feb. 4, 1932  7 Sheets-Sheet 4
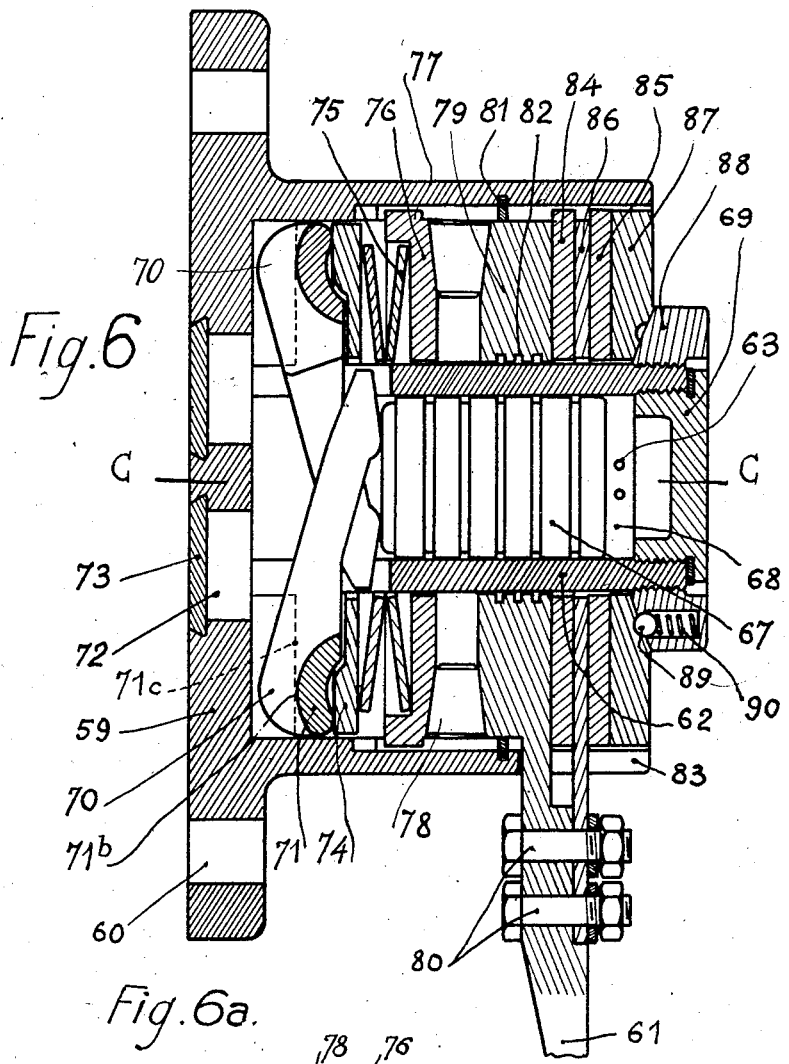
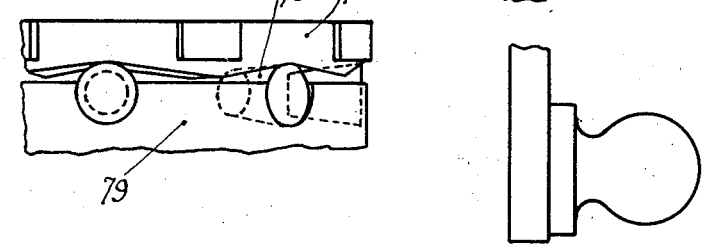
Lucien Simon
René Marcon
INVENTORS.
BY CA Snow & Co.
ATTORNEYS.

July 30, 1935.  L. SIMON ET AL  2,009,749
SHOCK ABSORBER
Filed Feb. 4, 1932  7 Sheets-Sheet 5
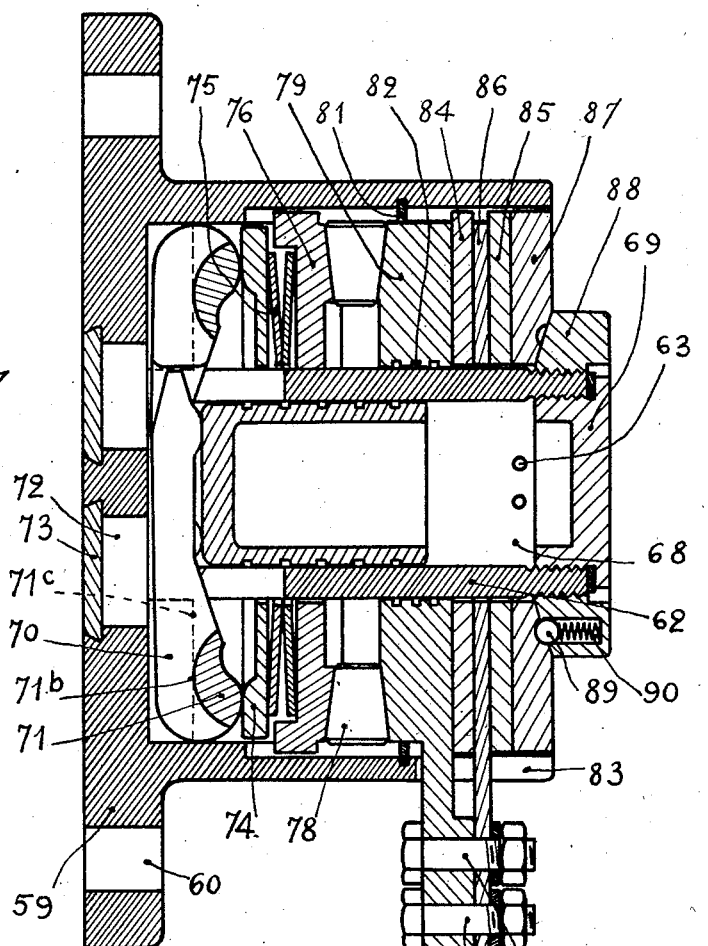
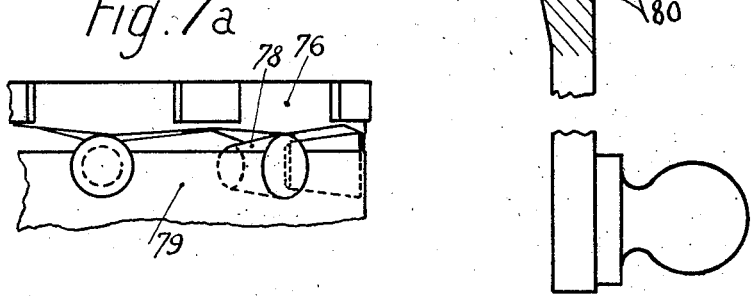
Lucien Simon
René Marcon
INVENTORS
BY *CA Snow & Co.*
ATTORNEYS.

July 30, 1935.  L. SIMON ET AL  2,009,749
SHOCK ABSORBER
Filed Feb. 4, 1932  7 Sheets-Sheet 6
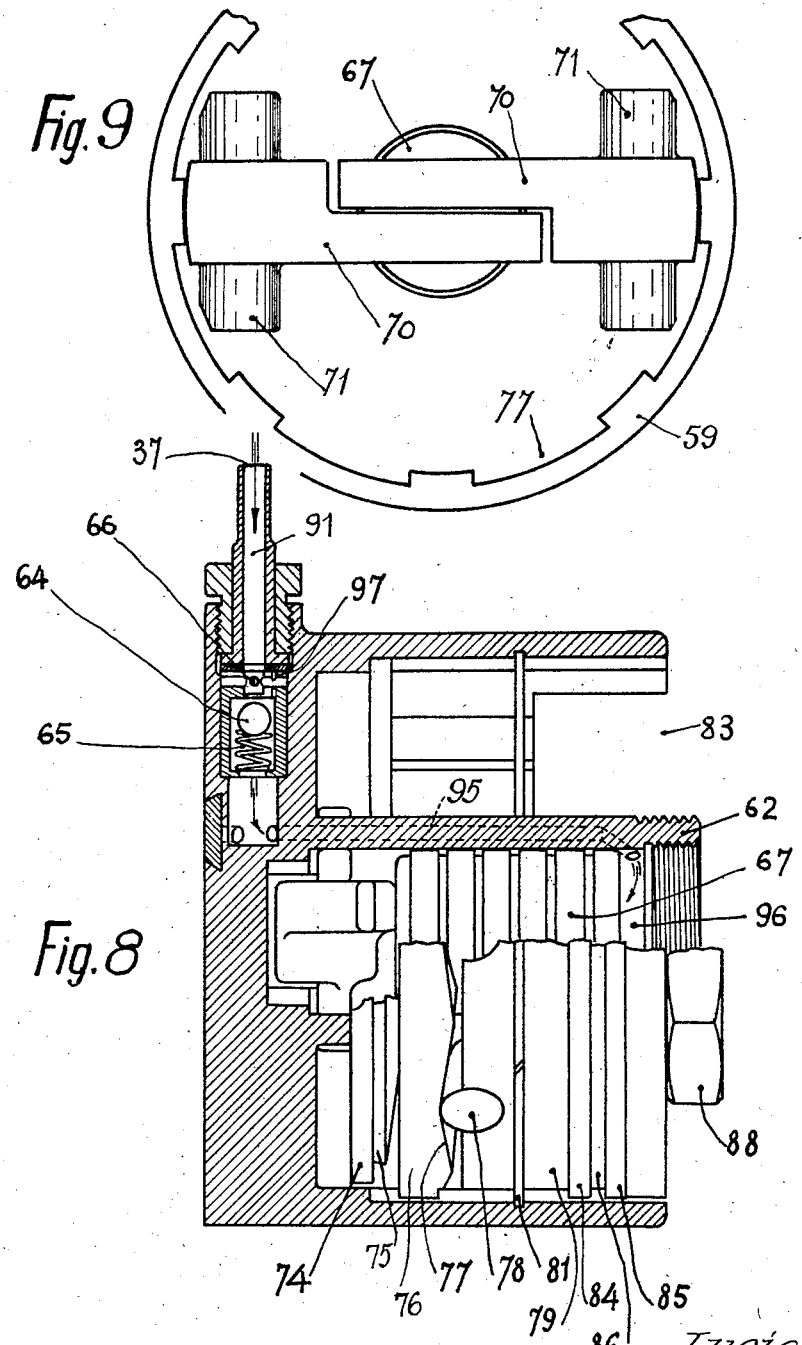
Lucien Simon
René Marcon
INVENTORS
BY C. A. Snow & Co.
ATTORNEYS.

July 30, 1935.  L. SIMON ET AL  2,009,749

SHOCK ABSORBER

Filed Feb. 4, 1932  7 Sheets-Sheet 7

Lucien Simon
René Marcon
INVENTORS

BY CA Snow & Co.
ATTORNEYS.

Patented July 30, 1935

2,009,749

UNITED STATES PATENT OFFICE 2,009,749

SHOCK ABSORBER

Lucien Simon and René Marcon, Paris, France, assignors, by direct and mesne assignments, to Societe d'Exploitation des Brevets Lucien Simon (Amortisseurs Sanchok) Societe Anonyme, Paris, France Application February 4, 1932, Serial No. 590,928
In France January 7, 1932

8 Claims. (Cl. 188—130)

The present invention has for its object a suspension shock absorber for automobile vehicles, flying machines and other uses, chiefly characterized in that it is adapted to work automatically in a synchronous manner according to the speed of the vehicle and the pot-holes and bumps in the surface on which the vehicle is moving.

It is well known that most of the shock absorbers that are now in use are based on mere empiricism, or are provided with an adjustment which depends merely on the weight of the vehicle, generally without taking into account the speed at which said vehicle is running.

However, if the work of a suspension is analyzed, two very distincts factors are to be considered; on the one hand the shocks to be absorbed, and on the other hand, the good running of the vehicle on the road at all speeds.

None of the shock absorbers which have been known to the present time meets simultaneously both of these requirements, and it is not quite sure that there exists one which fully meets the first requirement above mentioned and is so devised as to operate according to each shock.

On the other hand, the shock absorbers that are now existing have their characteristics of construction based upon only four principles entirely different from one another.

The shock absorbers made according to the first of these principles comprise a structure which is intended, through various means, to compress braking rings or washers between which is held one of the arms of the shock absorber. According to an initial adjustment based upon the weight of the vehicle, the suspension is subjected to a constant action wholly independent of the state of the road and speed of the vehicle. That principle, the effects of which are extremely unsatisfactory, is contrary to the most elementary laws on that question. Shock absorbers of that kind are usually called "friction shock absorbers".

The shock absorbers made according to the second principle comprise a structure which is intended, as in the preceding case, to compress steel washers provided with concentric contact surfaces, so that the merest bumps or pot-holes in the road surface will act upon the frictional stresses that are developed, due to a corresponding opening or closing of the arms of the shock absorber. That principle, which meets only the requirement relative to unequalities in the road surface, necessitates lubrication under pressure at too frequent intervals; it involves a quick wear and tear of the parts due to the metallic particles which are detached, stop the lubrication orifices, cause the frictional organs to seize, so that the shock absorber is quickly put out of order.

The shock absorbers made according to the third principle comprise a structure which is intended, through various means, which differ but slightly from one another, to compress, under the action of the bumps and pot-holes of the road surface, a viscous liquid acting upon a projecting part carried by one of the arms of the shock absorber in an inner cavity of the latter. Said cavity is connected to another cavity through an adjustable valve which is adjusted once and for all according to the weight of the vehicle, without the state of the road surface and the speed of the vehicle being taken into account. Said principle, the advantages of which are not questioned, however involves some drawbacks which cannot be accepted, due to the fact that the adjustment is made for a well determined live weight and that the increase or the lightening of the load make that type of shock absorber either inoperative or dangerous. Said shock absorbers are called "oil shock absorbers".

The shock absorbers made according to the fourth principle comprise a structure, similar to that described with reference to the first principle, and initially adjusted to correspond to a small tension, but provided with a device connected with the nut for the initial tightening, and which makes it possible to tighten or release, through a flexible cable control, the frictional organs of the shock absorber, in a positive manner, from the conductor's seat, through suitable operating means, in accordance with the state of the road surface and to the speed at which the vehicle is running. In the first place it is very disagreeable to be compelled to perform these continuously repeated manipulations which impair the driver's comfort, and, furthermore, the slackening of the flexible cables necessitates a constant supervision of the controlling organs.

The object of the present invention is to provide a shock absorber which is free from the above stated drawbacks.

Another object of the invention is to provide a shock absorber which is automatically adjusted so as to work in accordance with the speed of the vehicle and with the state of the road surface, either simultaneously or independently.

The invention is characterized by the following features:

(a) the shock absorber comprises one or several disks provided with concentric cam surfaces and shouldered by means of one or several elastic washers, such for instance as the so-called "Belleville washers". Said disks are adapted to cooperate with conical rollers and, under the action of an angular rotation caused by the operation of the shock absorber, they produce, through their cam surfaces, a mechanical expansion which determines a compression of one or several disks of any suitable shape, size, and constitutive material, disposed at a suitable point of the system. These disks, which are disposed between rings which separate them from one another, ensure, through their mutual friction, a braking action which is proportional and synchronized with the shocks of any kind which the shock absorber is intended to absorb automatically;

(b) the shock absorber further comprises a device, connected through either a direct or a reduction gear, which, under the effect of the compression of a fluid or liquid of any kind, subjects the above described whole to an additional pressure, in synchronism with the speed obtained by the vehicle. A characteristic feature is that the shock absorber balances the two synchronisms referred to in paragraphs (a) and (b) respectively, thus obviating any exaggerated amplification of the suspension. This results from the fact that the mechanical device tends to expand, owing to the cam surfaces, against the action of the fluid device which compresses it. The latter, which is separated, in the shock absorber from the remainder of the apparatus, by the closing of a check valve which is caused to operate when there is an excess of pressure, keeps said excess of pressure during a given time, during which said excess of pressure disappears gradually due to the presence of a discharge orifice whose dimension is chosen in accordance with the time of discharge which it is desired to obtain.

Preferred embodiments of our invention, including these and other characteristics thereof, will be hereinafter described with reference to the accompanying drawings, given merely by way of example, and in which:

Fig. 6 is a vertical sectional view of another type of shock absorber in the position of rest;

Fig. 6a is a detailed view of a portion of Fig. 6;

Fig. 7 is a corresponding view of the same shock absorber in operation;

Fig. 7a is a detailed view of a portion of Fig. 7;

Fig. 8 is an elevational view, partly in section, on the line C—C of Fig. 6;

Fig. 9 is a plan view showing the control fingers and the projections;

Figure 1:
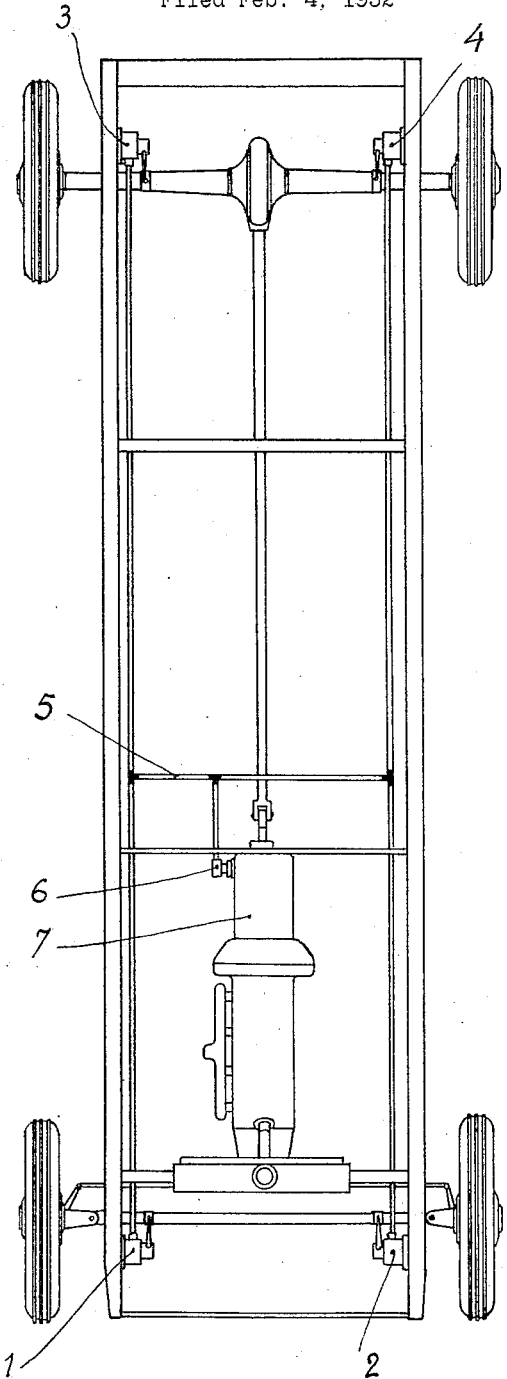
Fig. 1 is a general view of the arrangement of a shock absorbing system according to our invention on the four wheels of an automobile vehicle.
Figure 2:
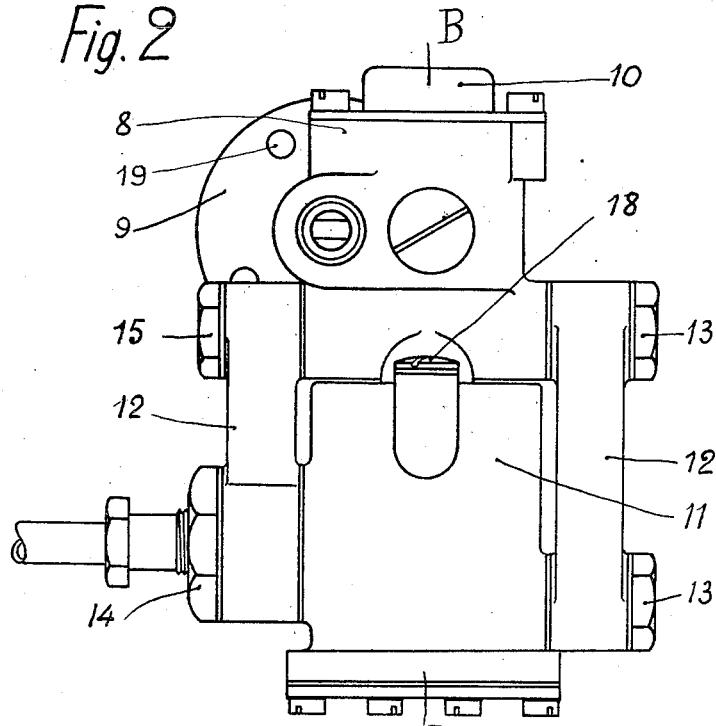
Fig. 2 is an elevational view of a telemechanical device for synchronizing the operation of the shock absorbers with the speed of the vehicle.
Figure 4:
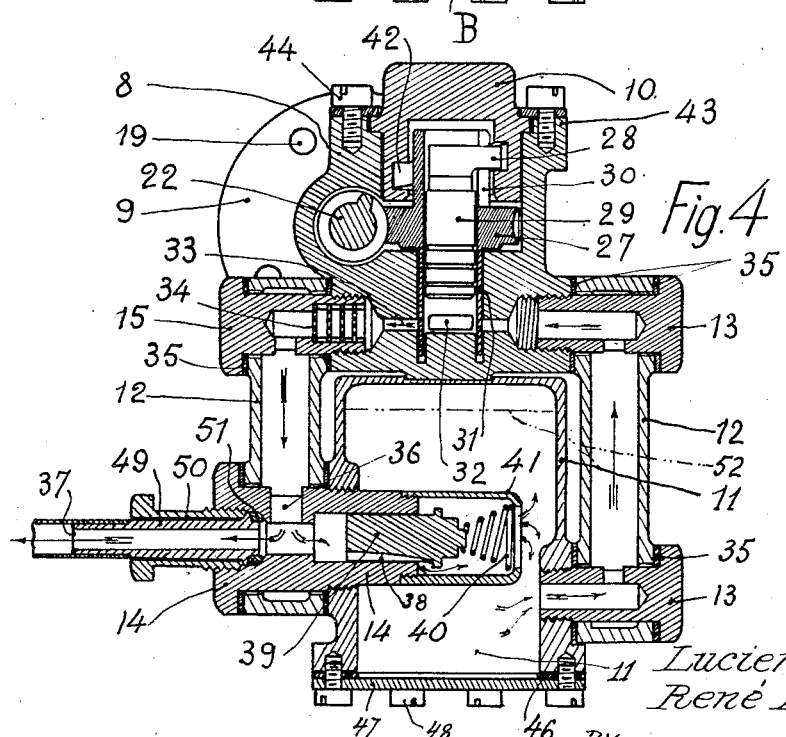
Fig. 4 is a section on the line A—A of Fig. 3.

In the embodiment of our invention showing a complete installation of shock absorbers on an automobile chassis, according to Fig. 1, two front shock absorbers 1 and 2 and two rear shock absorbers 3 and 4 are of the friction type and provided with helical controlling cam surfaces. The operation of said shock absorbers is automatically insured through telemechanical controlling means including an oil pipe 5 secured in any suitable manner and adapted to withstand high pressures, and connected to a unit 6 including a pump, a tank, and a feeding organ, said unit being connected to change speed box 7 of the vehicle, at the place where the speedometer is generally connected thereto.

The operation is as follows: When the vehicle is stopped, pump 6 does not discharge any liquid, and accordingly no pressure is exerted on the shock absorbers, which therefore, have their organs at rest. The driving of the pump 6 is effected simultaneously with that of the speedometer, so that the pressure increases exactly in correspondence with the various speeds of the vehicle.

Pump 6 is constantly primed in connection with its reserve of oil or any other liquid, so that, as soon as it is driven, it exerts pulsating compressions, the value of which is a function of the speed, into tubes 5. As said tubes are connected with shock absorbers 1, 2, 3 and 4, a well determined pressure is exerted on said shock absorbers, the frictional resistances therein being automatically increased through gradual tightening of the braking elements, in the case of increasing speeds, while the contrary action takes place through gradual releasing of the braking elements, in the case of decreasing speeds.

Particular arrangements are utilized in the various mechanisms and will be fully described hereinafter, for instance concerning the anti-shock device contained in each shock absorber, the automatic valve arrangements and the like.

Of course various embodiments of these apparatus can be used in connection with our invention.

In that way we obtain the full automaticity and synchronism of the shock absorbers in connection with the speed of the vehicle and with the shocks due to bumps and pot-holes in the road surface.

Figure 3:
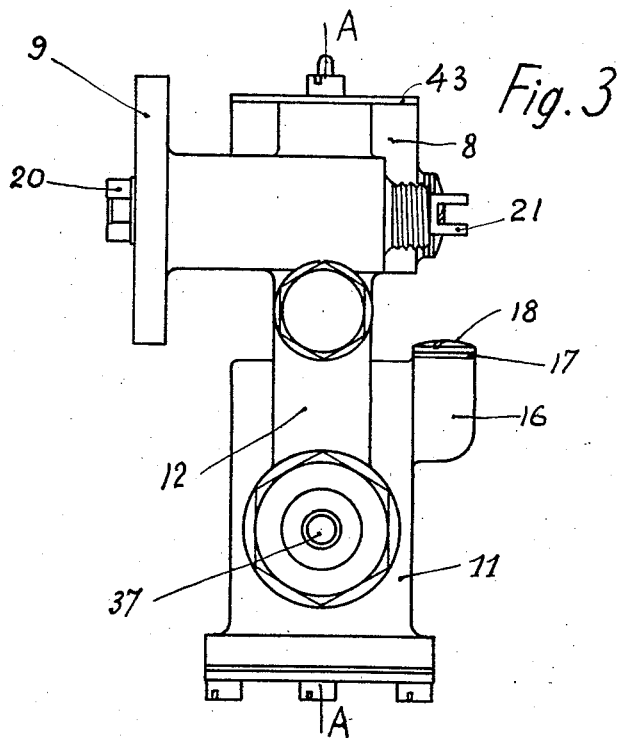
Fig. 3 is a corresponding side view.
Figure 5:
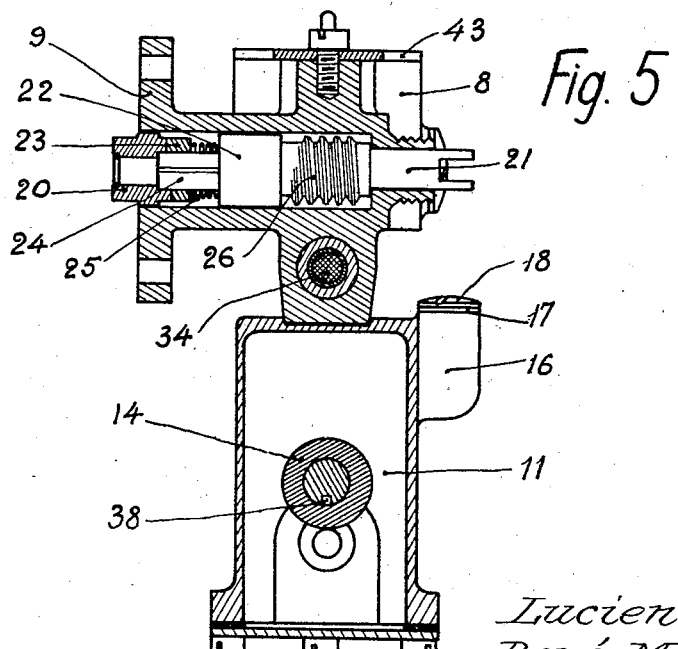
Fig. 5 is a sectional view on the line B—B of Fig. 2.

As shown in Figs. 2 to 5, the apparatus comprises a pump 8 located adjacent the flange 9 through which the whole is secured to the change speed box of the vehicle. The output of said pump can be adjusted through a piece 10 which can easily be reached so as to permit the initial adjustment corresponding to each vehicle. An oil reservoir 11 is connected to pump 8 through two conduits 12, the whole being assembled by means of bolts 13, 14 and 15. Reservoir 11 is filled through its inlet orifice 16 and it is obturated by means of a stopper 18, a gasket 17 being provided between the stopper and the seat thereof. The apparatus is secured to the change speed box through suitable means engaging fixation holes 19, and the pump is driven through coupling 20 which, in turn, transmits the motion to the speedometer, through coupling 21 (Figs. 3 and 5).

The pump shown in the accompanying drawings by way of example comprises a driving shaft 22 (Figs. 4 and 5) which can be driven only in one direction; the irreversibility of the drive is obtained by means of a dog clutch 23 which, when the vehicle is running in a rearward direction, ceases to be engaged with driving member 20, due to its sliding along grooved shaft 24, against the action of spring 25 which maintains the parts in a position corresponding to direct drive. Two smooth parts, suitably spaced apart, maintain the shaft in position. A worm 26 is adapted to mesh with a worm wheel 27 to which it imparts a rotary motion in a clockwise direction. Said worm wheel is integral with a sleeve 31 provided with a longitudinal slot 30. A piston 29 is adapted to move inside said sleeve. Said piston is provided with a lug 28, extending throughout said slot 30 of sleeve 31, and adapted to engage a cam groove 42 provided in piece 10. Said lug causes piston 29 to rotate about its axis under the action of sleeve 31 integral with wheel 27, and to reciprocate within said sleeve as a result of the engagement of said lug in groove 42. A port 32 is provided at the lower part of sleeve 31 so as to successively uncover the orifices of an oil conduit 33 extending on either side of sleeve 31, on one side to the inlet of the pump and on the other side to the outlet thereof. The piston draws in a certain quantity of oil from reservoir 11 through pipe 12, according to the direction of arrow 33, and through port 32. Then, as sleeve 31 rotates, the inlet orifice of pipe 33 is obturated, and the oil begins to be compressed in the lower part of the sleeve by the downward movement of piston 29. When sleeve 31 has rotated through 180° port 32 uncovers the orifice of the outlet branch of pipe 33, and the oil is driven out through the outlet pipe 12, after a quadruple filtering through filters 34 provided in hollow bolt 15. Gaskets 35 insure the fluid tightness of the connections of pipes 12 with pump 8 and with reservoir 11. The oil that is forced into outlet pipe 12 moves in a downward direction.

The operation is as follows:

For a good comprehension of what follows, it should be well understood that pipe 5 (Fig. 1) is quite free from air and is filled with special oil.

A portion of oil, and all the quantities of oil that will follow, enters through orifice 36 of hollow bolt 14. According to the principle of communicating vessels, the pressure is equal in all the organs of the system. The fraction of oil in question is therefore compressed on the whole through orifice 36, and it is distributed in a way determined by the requirements of the device: toward feed pipe 37 and toward reservoir 11 to which it is returned through the progressive opening of a passage 38 provided in the small piston valve 39. Said valve is normally applied against its seat for the initial pressure by pyramid-shaped spring 40, which is adjusted in the proper position by means of a hollow cover 41 screwed at the end of bolt 14. Valve 39 is moved against the action of said spring, under the effect of the continuous or successive pressures to which the liquid is subjected, and its displacements are proportional to the needs, so as to let pass through opening 38, proportionally with the speed of the vehicle, the liquid whose pressure exceeds the pressure of the pump at that very moment.

If it be supposed that the speed of the vehicle increases, the pressure of the oil increases in the pipes as a function of the speed of the vehicle, which determines the speed of revolution of the pump. The pressure exerted on the shock absorbers is therefore increased so as to brake them progressively.

The strength of spring 40 and the size of slot 38, according as they will be great or small, will cause to be admitted into the reservoir 11 only a quantity of oil which is a portion of the output of the pump into its outlet pipes and varies with the pressure in said pipes, which is a function of the speed of the vehicle.

If it be supposed that the speed of the vehicle decreases, the oil pressure decreases in the pipes proportionally with the diminution of the speed. As the pressure exerted on the shock absorbers decreases, the friction between the organs of said shock absorbers is accordingly diminished, so as to adjust the resistance of said shock absorbers in proportion with the speed of the vehicle.

If it be supposed that a determined speed of the vehicle is maintained during a certain time, the oil pressure is maintained in the pipes at a value which is a function of the speed in question, and the excess of oil escapes through opening 38 of valve 39 which compresses spring 40.

These three cases are given by way of examples so as to illustrate all the conditions of working of the apparatus. Each apparatus has its own adjustment which can be determined by means of three organs so as to adapt said apparatus to a vehicle of any kind whatever, whatever its weight and speed may be. Said organs are:

(a) Springs 40 of different strengths;

(b) Valves 39 provided with apertures 38 of different sizes;

(c) A piece 10 rotatably mounted so as to displace the position of cam surface 42 in which lug or finger 28 of piston 29 moves, so that it can cause a reduction of the piston stroke. A diminution of the pressure in a given time results therefrom. A locking ring, secured through screws 44, serves to fix piece 10 in the desired position.

The apparatus may optionally comprise the following features; the base of reservoir 11 is removable so as to facilitate cleaning thereof; a gasket 46 and a cover plate 47 insure through screws 48 perfect fluid tightness.

The connection of the pipes of the shock absorbing system with the pump is ensured, at the extremity of outlet pipe 12 by a part 49 to which is welded said pipe of the shock absorbing system, the whole being held by an elongated nut 50, which squeezes a packing 51.

Hollow bolt 14, is readily accessible for removing the parts and replacing organs 39—40, same as bolt 15 which is provided with filters.

Attention is again called to the fact that the apparatus, given by way of example, cannot operate in both directions. It is for that reason that a dog clutch coupling 23 is provided in the driving means of the pump. The level 52 of the oil can move down without danger, provided it does not come as low as the orifice of inlet pipe 12.

As no leakage of oil should normally happen, the apparatus has been provided with a reservoir of small volume which may be increased according to the needs.

In the embodiment shown in Figs. 6 to 9 (including Figs. 6a and 7a, which are detail views) the apparatus comprises a complete shock absorber enclosed in a casing 59 secured to the frame of the vehicle by means of bolts extending through holes 60 and connected to the suspension organs through arm 61. In its central part casing 59 is provided with a cylinder 62 the inner wall of which comprises oil inlet holes 63 connected with the oil feed pipe 37 (Fig. 8) at the end of which is disposed a check valve consisting of a ball 64 maintained by a spring 65. A by-pass formed by conduits 97 and 66 is so arranged as to permit oil to flow slowly past said valve 64, when the latter is in the closed position, as shown in Fig. 8. A hollow piston 67 (Fig. 8) provided with outer grooves, so as to ensure a better fluid tightness is fitted in its cylinder 68, which is closed by a hollow stopper 69 screwed in said cylinder with a suitable packing interposed so as to ensure fluid tightness. Two fingers 70 made of highly resistant steel, and each comprising a transverse part 71, are adapted to slide in two spaces disposed axially in the wall of tube 62. In the end face of the casing two holes 72, provided for the machining of the piece, are obturated by disks 73.

Fingers 70—71, which bear at points 71b against the wall 71c have their outer ends in contact with a suitably profiled ring 74, which tends to compress two elastic washers 75, of the so-called "Belleville" type for instance. One of said washers engages a disk 76 the other side of which is provided with a plurality of cam surfaces. Said disk is provided with a plurality of external projections 77 engaging corresponding recesses in the casing so that it can only slide with respect to said casing. Said disc 76 is adapted to cooperate with conical rollers 78 mounted in corresponding recesses provided in a rotatable disk 79 which is integrally connected to the outer arm 61 of the shock absorber by means of bolts 80. A packing ring 81 and grooves 82 insure the fluid tightness of the device so as to avoid that its lubricant may leak outwardly and reach the other organs The angular displacement of arm 61 takes place through an aperture 83. Two braking rings 84 and 85, made of a suitable material, and holding between them a steel ring 86 rigidly connected to arm 61 through bolts 80, constitute the braking device of the shock absorber. A thick ring 87 compressed by nut 88, which is screwed on tube 62, provides for the initial adjustment of the shock absorber. A ball 89, compressed by a spring 90, and mounted in nut 88, makes it possible to lock the latter in a given position, said ball 89 being adapted to engage a series of holes provided in ring 87.

The operation of the shock absorber is as follows: First considering the required synchronism of the operation of the shock absorber with the speed of the vehicle, the liquid (either a special oil, or a fluid utilized for its displacement) subjected to a pressure which is a function of the speed of the vehicle through one of the above described means, passes from pipe 5 into the inlet orifice 91 (Fig. 8), moves past inlet 66, lifts ball 64 from its seat by compressing spring 65, and flows through conduits 95 provided in the wall of tube 62, until it comes into chamber 96, where it acts upon hollow piston 67. Said piston acts upon fingers 70 and exerts, with a certain leverage and through transverse parts 71, a certain pressure upon ring 74 so as to compress elastic washers 75. Under the action of said pressure, said washers are substantially flattened and when they are no longer resilient they transmit the pressure or thrust exerted thereon to disk 76 which, whatever position conical rollers 78 may occupy on the corresponding cam surfaces of 76, transmit the effort to rotary disk 79. Said disk compresses, proportionally with the thrust exerted thereon, friction rings 84 and 85 against a steel ring 86 fastened to arm 61 through bolts 80.

The synchronization of the working of the shock absorbers with respect to the speed of the vehicle is obtained in a scientific manner and a good running of said vehicle is obtained at all speeds.

Synchronism with the shocks: under the action of shocks, either small or great, slow or quick, soft or sudden, the axle which carries pivoted arm 61 imparts to the latter more or less rapid and important oscillations, so that rotary disk 79 transmits to disk 76, through conical rollers 78, proportional stresses. The cooperation of disk 76, with its cam surfaces, with rollers 78 causes the whole system to expand and to act on friction rings 84—85 by compressing them more or less strongly, the oscillations producing a braking action in both directions. A balancing of the two kinds of braking actions which are produced now comes into play. As a matter of fact, for a certain speed of the vehicle corresponding to a proportional pressure on the shock absorbers, the shock resulting from a bump in the road surface may correspond to a greater value than the frictional stresses which are developed at that time and which correspond merely to the speed. It follows that a supplementary compression is exerted on the friction pieces during the movements due to bumps and potholes in the road surface and produces a braking action thereon which is in constant ratio with the value of each shock. But piston 67, subjected, under the action of the shocks, to back pressures stronger than the pressure at 91, compresses the oil contained in the inlet pipes. As the internal pressure becomes higher than the external pressure, the check valve operates and ball 64 obturates inlet hole 91 by being applied against its seat, while an orifice 66, of suitable shape and position allows the excess of oil to be slowly returned into conduit 91. Any further increase of pressure in pipe 5 is relieved through valve 39, and allows a general balancing of the pressures.

Figure 10:
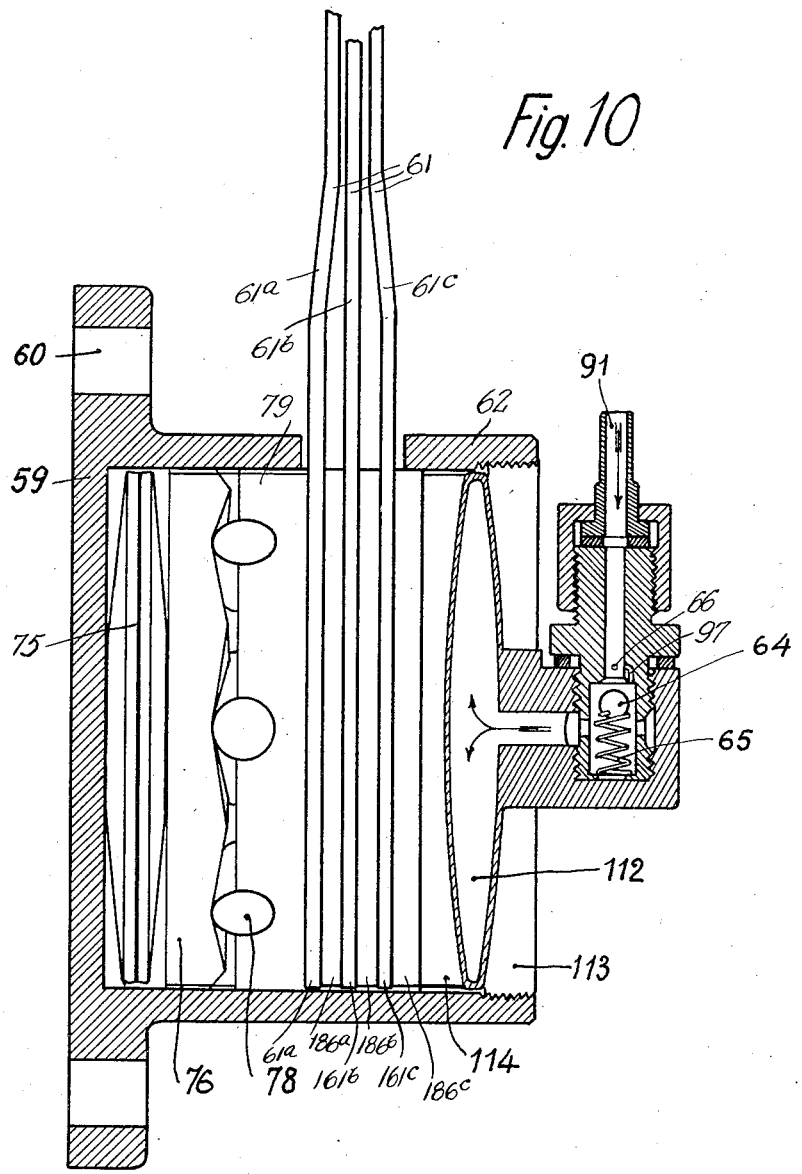
Fig. 10 is a vertical section of another embodiment.

According to another embodiment of the present invention, illustrated by Fig. 10, the shock absorber is fitted in a casing 59 adapted to be secured to the vehicle frame. This shock absorber includes an arm 61 adapted to be operatively connected with the suspension organs of the vehicle and consisting of three parallel branches 61a, 61b, and 61c. The central part of casing 59 forms a cylinder 62. The portions 61a, 61b and 61c of arm 61 are integral with discs 161a, 161b, and 161c respectively, adapted to rotate within casing 59. Braking rings 186a, 186b and 186c are mounted adjacent said discs and between them. Discs 161a, 161b, and 161c are rigidly connected with a rotatable disc 79 fitting in cylinder 62 and adapted to slide therein. Elastic washers 75 of any suitable type are inserted between the inner lateral face of casing 59 and a disc 76 the other side of which is provided with a cam surface. This disc 76 is arranged to slide in cylinder 62 parallelly to the axis thereof but cannot rotate about said axis. The cam surface of disc 76 is adapted to cooperate with conical rollers 78 rotatably mounted in conical recesses provided in disc 79.

In this embodiment, which involves the use of a high pressure oil pump, it is possible to directly utilize the oil pressure for automatically adjusting the braking friction owing to the following arrangement, illustrated by Fig. 10:

A deformable metallic box 112, inserted between a cup-shaped nut 113 closing the outer end of cylinder 62 and a thick disc 114 located in contact with ring 186c can be fed with oil from inlet pipe 91. Between this inlet pipe and box 112, there is interposed a ball valve 64 subjected to the action of a spring 65. A by-pass formed by conduits 97 and 66 is provided for allowing oil to flow out past said ball valve 64, with a slow rate of flow, when said valve is applied against its seat by the combined action of spring 65 and of the pressure within box 112.

It will be readily understood that an increase of the pressure in said box 112 pushes the whole of the system toward the left hand side and thus increases the braking pressure between discs 161a, 161b, 161c and rings 186a, 186b, 186c. As for the increase of the braking action resulting from an angular displacement of arm 61 and caused by the cooperation of the cam surface of piece 76 with rollers 78, it is exactly the same as in the preceding embodiment.

What we claim is:

1. In a vehicle adapted to be driven by an engine and having resilient suspension means, a shock absorbing device comprising in combination, at least two braking elements in frictional sliding contact with each other, one of said elements being secured to the vehicle proper and the other one to the resilient suspension means, a chamber of variable volume having a movable wall, means for forcing liquid into said chamber at a pressure in accordance with the speed of the vehicle, means, operatively connected with the element that is secured to the resilient means, and means operatively connected with said movable wall for acting in series on said braking elements so as to press them against each other with a strength varying in accordance with both the amplitude of the displacements of the element that is secured to the resilient suspension means and the pressure of the liquid, means for preventing a sudden outflow of the fluid from said chamber, and means for allowing a slow outflow of the fluid from said chamber.

2. In a vehicle adapted to be driven by an engine and having resilient suspension means, a shock absorbing device comprising in combination, a casing adapted to be secured to the vehicle proper, an arm connected with said resilient suspension means, a disk rigid with said arm and rotatably mounted in said casing, a ring slidably mounted in said casing, and frictionally engaging said disk, means, operatively connected with said arm, for pressing said ring against said disk with a strength in accordance with the amplitude of the oscillations of said arm, a chamber of variable volume having a movable wall acting in series with the last mentioned means for pressing said ring against said disk with a strength in accordance with the pressure in said chamber, an inlet conduit for admitting liquid under pressure into said chamber, and means, operatively connected with the engine, for forcing liquid through the last mentioned conduit at a rate proportional with the speed of the vehicle, a check valve in said inlet conduit adapted to prevent the escape of liquid under pressure from said chamber through said inlet conduit, and a by-pass conduit of restricted cross section as compared with that of said inlet conduit for permanently connecting together the portions of said inlet conduit located on either side of said check valve respectively.

3. In a vehicle adapted to be driven by an engine and having resilient suspension means, a shock absorbing device comprising in combination, a casing adapted to be secured to the vehicle proper, an arm connected to said resilient suspension means, a disk rigid with said arm and rotatably mounted in said casing, a ring slidably mounted in said casing and frictionally engaging said disk, means operatively connected with said arm for pressing said ring against said disk, with a strength in accordance with the amplitude of the oscillations of said arm, a cylinder concentrically mounted in said casing and extending throughout the central parts of the above mentioned disks and rings, a hollow piston in said cylinder, means acting in series with the last mentioned means for transmitting the motion of said piston to said ring so as to push it against said disk, an inlet conduit for admitting liquid under pressure into said cylinder, means, operatively connected with the engine, for forcing liquid through the last mentioned conduit at a rate proportional with the speed of the vehicle, a check valve in said inlet conduit adapted to prevent the escape of liquid under pressure from said cylinder through said inlet conduit, and a by-pass conduit of restricted cross section as compared with that of said inlet conduit for permanently connecting together the portions of said inlet conduit located on either side of said check valve respectively.

4. In a vehicle adapted to be driven by an engine and having resilient suspension means, a shock absorbing device comprising in combination, a casing adapted to be secured to the vehicle proper, an arm connected to said resilient suspension means, a disk rigid with said arm and rotatably mounted in said casing, two friction rings located one on each side of said disk, one of said rings being mounted stationary in said casing while the other one is slidably mounted therein, a disk, rigidly connected with said arm rotatably mounted in said casing in contact with the slidable ring, a ring provided with cam surfaces on its side adjacent said last mentioned disk and slidably mounted in said casing, a plurality of means adapted to cooperate both with said cam surfaces and with said last mentioned disk for moving them apart from each other when said disk is rotated, another ring slidably mounted in said casing, a cylinder concentrically disposed in said casing and extending throughout the central parts of the above mentioned disks and rings, a hollow piston in said cylinder, means for transmitting the motion of said piston to said ring, an inlet conduit for admitting liquid under pressure into said cylinder, means, operatively connected with the engine, for forcing liquid through said inlet conduit at a rate proportional with the speed of the vehicle, a check valve in said inlet conduit adapted to prevent the escape of liquid under pressure from said cylinder through said inlet conduit, and a by-pass conduit of restricted cross section as compared with that of said inlet conduit for permanently connecting together the portions of said inlet conduit that are located on either side of said check valve respectively.

5. In a vehicle adapted to be driven by an engine and having resilient suspension means, a shock absorbing device comprising in combination, a casing adapted to be secured to the vehicle proper, an arm connected to said resilient suspension means, a disk rigid with said arm and rotatably mounted in said casing, two friction rings, one on each side of said disk slidably mounted in said casing in contact with said disk, an obturating plate for said casing located adjacent one of said rings, a thick disk rigidly connected with said arm, rotatably mounted in said casing adjacent the other one of said rings, said thick disk being provided with a plurality of recesses, a plurality of conical rollers rotatably mounted in said recesses respectively, a ring provided with cam surfaces on its side adjacent said conical rollers, and slidably mounted in said casing so that said cam surfaces may cooperate with said rollers, another ring slidably mounted in said casing and operatively connected with the last mentioned ring, a cylinder concentrically disposed in said casing and extending throughout the central parts of the above mentioned rings and disks, a hollow piston in said cylinder, means for transmitting the motion of said piston to the last mentioned ring, means for admitting liquid under pressure into said cylinder, means, operatively connected with the engine, for forcing liquid through the last mentioned means at a rate proportional with the speed of the vehicle, a check valve for preventing the escape of liquid under pressure from said cylinder, and an outlet conduit of restricted section for allowing liquid under pressure to slowly escape from said chamber when said check valve is closed.

6. In a vehicle adapted to be driven by an engine and having resilient suspension means, a shock absorbing device comprising in combination, a casing adapted to be secured to the vehicle proper, an arm connected to said resilient suspension means, a disk rigid with said arm and rotatably mounted in said casing, a ring slidably mounted in said casing and frictionally engaging said disk, means, operatively connected with said arm for pressing said ring against said disk, a metallic deformable box having a deformable wall adapted to cause said ring to press against said disk, a conduit for admitting liquid under pressure into said box, means, operatively connected with the engine for forcing liquid through said conduit at a rate of flow proportional with the speed of the vehicle, a check valve in said conduit adapted to prevent the escape of liquid under pressure from said box through said conduit, and a by-pass conduit of restricted cross section as compared with that of said first mentioned conduit for permanently connecting together the portions of said first mentioned conduit that are located on either side of said check valve respectively.

7. A shock absorber comprising a hydraulic cylinder, a flange secured to one end of said cylinder, friction elements fitted on said cylinder, a piston movable in said cylinder, and means for transmitting the motion from said piston to said friction elements.

8. A shock absorber comprising a hydraulic cylinder, a flange secured to one end of said cylinder, friction elements fitted on said cylinder, a piston in said cylinder subjected to the pressure of a hydraulic controlling medium and levers for transmitting the motion from said piston to said friction elements.

LUCIEN SIMON.
RENÉ MARCON.